(No Model.)

C. G. CHOEN.
SAND PUMP OR OTHER PIPE.

No. 461,997. Patented Oct. 27, 1891.

Attest:
S. W. E. Sanford
M. L. Levy

Inventor;
Charles G. Choen
by C. D. Moody
his atty

UNITED STATES PATENT OFFICE.

CHARLES G. CHOEN, OF ST. LOUIS, MISSOURI.

SAND-PUMP OR OTHER PIPES.

SPECIFICATION forming part of Letters Patent No. 461,997, dated October 27, 1891.

Application filed August 30, 1889. Serial No. 322,432. (No model.)

*To all whom it may concern:*

Be it known that I, CHARLES G. CHOEN, of St. Louis, Missouri, have made a new and useful Improvement in Flexible Elbows for Dredging-Pipes or other Pipes, of which the following is a full, clear, and exact description.

The improvement is adaptable to many varieties of pipes used for the transmission of fluids, steam, and air, and it is notably adapted to the suction-pipe of a sand-pump, through which, by the action of the pump, the current of sand and water is elevated, and it is now in use in raising sand from the bottom of the Mississippi river. In such operations the pump is usually located upon a boat and the suction-pipe is lowered therefrom to the river-bottom.

By means of the improvement such pipes as are mentioned can be readily and safely turned in their course to point or to lead to any quarter or direction desirable.

The improvement consists, mainly, in a universally-adjustable elbow introduced into the pipe between sections thereof. It is especially useful in lines of pipe whose sections are rigid—such, for instance, as metallic tubes used in conveying water, steam, or air—as thereby a line of pipe of a very strong durable nature can be readily and economically produced, and one, at the same time, capable of being led, turned, or adjusted in any direction, substantially as is hereinafter set forth and claimed, aided by the annexed drawings, making part of this specification, in which—

Figure 1:
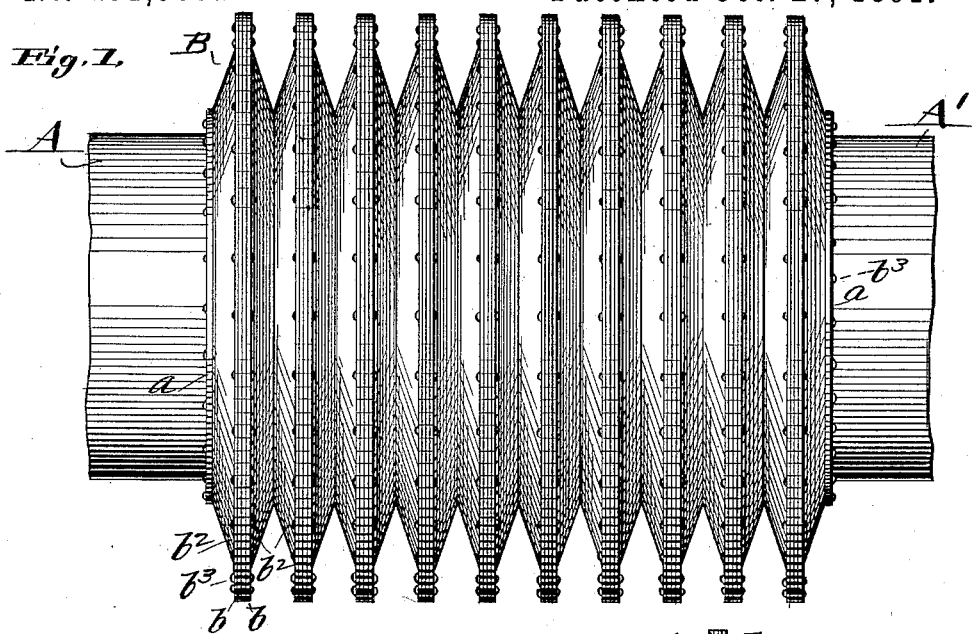
Figure 2:
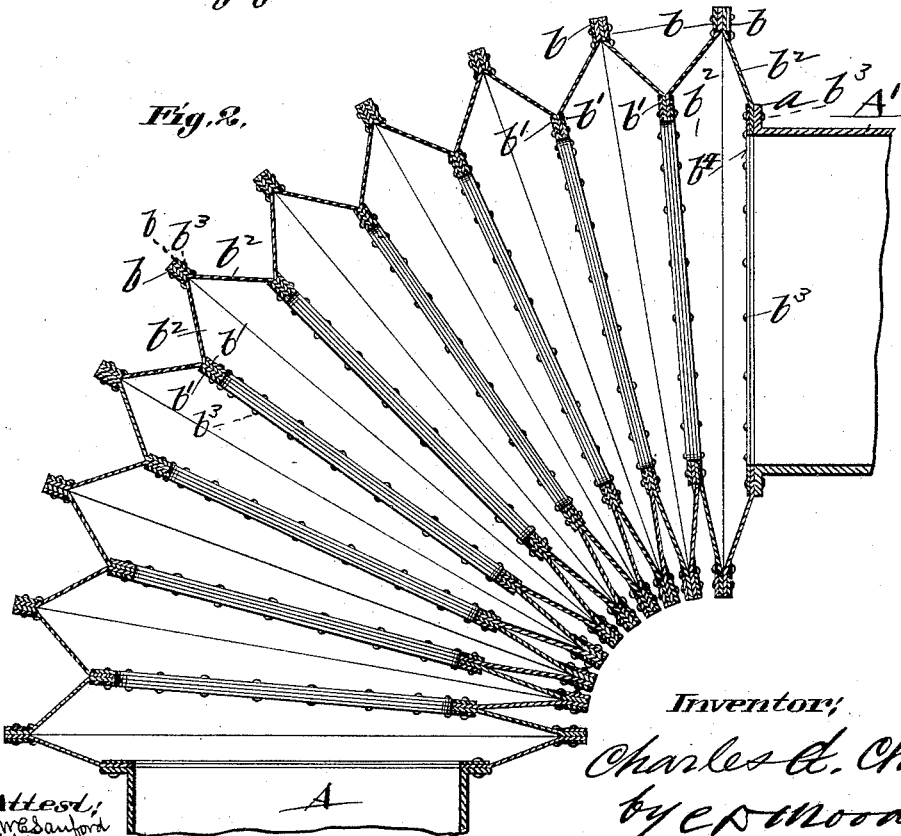

Figure 1 is a side elevation showing two sections of pipe united by means of the improved elbow. Only the end portions of the sections are shown, and the line of pipe is shown straight and the elbow well closed; and Fig. 2, a longitudinal section of the part of Fig. 1, the elbow being more opened and curved and the pipe-sections being at an angle with each other.

The same letters of reference denote the same parts.

A A' represent the two sections to be united, and B represents the elbow. The last-named part is composed of larger rings $b$ and smaller rings $b'$, alternately arranged and successively united by means of flexible annular pieces $b^2$, say of rubber or leather, and forming, generally considered, a construction cylindrical in its general outline, but having folds resembling those used in a bellows or an accordion, and which are capable of being closed together and opened apart from each other and held parallel with or inclined to each other, substantially as shown.

A special and desirable feature is making the elbow, considered generally, larger in diameter than the pipe-sections A A', as thereby a current flowing through the line or pipe is less likely to be checked at the elbows. The preferable mode of connecting the pieces $b^2$ with the rings $b$ $b'$ is to clamp the adjoining edges of the pieces $b^2$ between a pair of rings—that is, the outer edges of two adjoining pieces $b^2$ are clamped between a pair of rings $b$ and the inner edges between a pair of rings $b'$, and in attaching the elbow to the sections A A' the inner edge of an end piece $b^2$ is by means of a ring $b^4$, made in a generally similar way to rings $b$ and $b'$, clamped to the flange $a$ upon the section, substantially as shown. The rings are thus secured by means of suitable rivets $b^3$. The rings $b$ $b'$ are valuable also as a means for preventing the elbow from collapsing or expanding or otherwise getting out of shape.

The herein-described elbow is especially useful in connection with the suction-pipe of an apparatus for raising sand from a river-bottom, first, in that it enables that portion of the suction-pipe which extends downward through the water to be held at a steeper inclination, so that the lower end of the pipe shall drop into the cavity, which is usually formed in the river-bottom, as the sand is raised, and thus keep in a position favorable for drawing the sand into the pipe, and, second, that it enables either the pipe or the boat to move without straining any of the connections with the pipe or pump.

The improvement is, as stated, of general value in that it enables a line of pipe to be mainly, and thereby economically and strongly, composed of rigid iron tubes, for such tubes, when united by means of the herein-described elbows, form in effect a flexible line of pipe. In the case of a sand-pump apparatus the present elbow is located quite near the boat or other support of the pump, and the section A' may be considered the shorter piece of tubing leading to the pump and the section A the longer piece of tubing leading downward to the river-bottom.

The invention resides in the particular manner in which the folding coupling or elbow has its sections connected and has its ends connected to the ends of the pipes A A'. Each of said pipes has an outstanding circumferential flange $a'$, between which and the adjacent ring $b'$ the adjoining edge of the nearest annular piece $b^2$ is secured by rivets or bolts $b^3$. The outer adjoining edges of the pieces $b^2$ are secured by rivets or bolts between two facing rings $b$, and their inner adjoining edges are similarly secured between two rings $b'$, so that the coupling or joint is compact and solid and yet of larger diameter generally than that of the pipes A A'.

I claim—

In a flexible joint or elbow for connecting rigid sections of sand and water pipes, annular flexible pieces $b^2$, rings $b'$ of greater rigidity than said pieces $b^2$ and of substantially the same size as the pipes to be connected, and similar rings $b$ of greater diameter encircling said first-mentioned rings, said pieces $b^2$ being clamped at their inner edges between rings $b'$ and at their outer edges between rings $b$, whereby the pipe sections may be bent at an acute angle, substantially as described.

Witness my hand this 26th of August, 1889.

CHARLES G. CHOEN.

Witnesses:
C. D. MOODY,
D. W. C. SANFORD.